United States Patent Office 2,693,419
Patented Nov. 2, 1954

2,693,419

FRUITED CEREAL PRODUCT AND PROCESS THEREFOR

Curtis H. Gager, Scarsdale, N. Y., assignor to General Foods Corporation, New York, N. Y., a corporation of Delaware No Drawing. Application April 24, 1950,
Serial No. 157,854

5 Claims. (Cl. 99—83)

The present invention relates to a breakfast cereal of the dry, crisp type which is generally served with sugar and cold milk or cream. More particularly, it relates to a product of this type containing fruit and to a method for preparing the same.

It has long been desired to provide a dry, crisp breakfast cereal product containing fruit. The use of fresh fruit in this connection while desirable is, of course, for the most part impossible for reasons of spoilage. Some attempts have been made to incorporate fresh fruit in the form of fruit pastes, purees and juices into the ultimate dry cereal product by adding the same to cereal doughs which are cooked and otherwise processed into breakfast cereal products of various forms. However, subjecting such fruit materials while contained in the cereal dough to the elevated temperatures involved in cooking and otherwise processing the dough, results in the destruction of most, if not all, of the characteristic flavor of the fruit material. Accordingly, those fruits known commercially as "dried fruits," not being subject to spoilage, are the only ones that can be employed with a dry, crisp breakfast cereal and are so used by simply admixing them with the finished cereal product.

Although "dried," such fruits still contain an appreciable amount of water, usually 15–30%, and such is required if they are to retain a satisfactory soft texture. The moisture content of such fruit is high as compared with that of most breakfast cereals which in order to be sufficiently crisp are necessarily quite dry. Cereal flakes, for example, contain only about 2–3% moisture. Thus, the combination in one packaged product of a dry, crisp breakfast cereal with a moist, soft textured dried fruit requires bringing together two incompatible items. Because such breakfast cereals as, for example, flakes absorb moisture avidly they must be marketed in moisture proof packages or else they will absorb moisture from the atmosphere and lose their crispness. While a moisture-proof package prevents the cereal flakes from absorbing moisture from the atmosphere it can hardly prevent the flakes from absorbing moisture from the dried fruit with which they are admixed inside the package. Such dehydration of fruit by the cereal occurs rapidly and to a sufficient degree that marketing a product of this general type in a satisfactory manner is exceedingly difficult. Accordingly, attempts to market a packaged product containing a dried fruit such as raisins admixed with a dry cereal such as cereal flakes have met with difficulty due to the cereal losing its crispness and becoming soggy, and the fruit becoming tough even in the course of a relatively short shelf-life.

In an attempt to overcome this last difficulty, at least with respect to the cereal flakes, bran flakes have been packaged in admixture with the various dried fruits such as raisins. Bran flakes being more flinty than other flakes do not show the effects of moisture absorption to the same extent as do the other flakes. There still remains the problem of the dehydration of the fruit, however, so that relatively expensive methods of distribution are required in order to provide the consumer with a product which has not been on the grocer's shelf for too long a period of time.

Moreover, there remain other difficulties which are inherent in connection with the handling of this type of product. These difficulties are primarily due to the disparity between the fruit and the cereal flakes with respect to their bulk densities. Because of this, for example, it is difficult to blend the mixture to provide a proper distribution of the fruit and cereal flakes but even when such a distribution is obtained there remains the tendency for segregation within the package in the course of the handling involved in distributing the product. Also, there is still the problem of how to provide the consumer with a satisfactory ratio of fruit to cereal because of the differences with respect to the manner in which the two materials pour from the container.

Also, the size of the dried fruit used in such admixtures is necessarily limited if extreme heterogeneity in the product is to be avoided. For this reason raisins are practically the only fruit that may be employed. Cut or diced fruit may not be used to cure this defect inasmuch as the new surfaces which are thus exposed are excessively sticky so that the addition of such pieces to the cereal results in agglomeration of the fruit with other fruit pieces and/or with the cereal particles. Moreover, the size of the cereal particles are also necessarily limited if any semblance of homogeneity is to be achieved in the final product. For this reason such products are restricted to the use of the smaller cereal forms such as flakes, puffs and the like.

It is an object of the present invention to provide a cereal product containing dried fruit in which the cereal retains its crispness and the fruit its characteristic soft texture and fruit flavor even during an extended shelf-life.

It is also an object to provide a cereal product containing dried fruit in which there is no substantial dehydration of the fruit by the cereal.

Another object is to provide such a product in which the problem in connection with blending and segregation is eliminated and control of the fruit to cereal ratio contained in the individual servings is afforded.

Still another object is to provide such a product in which the number of fruit materials which may be employed is limited only by the dried fruits that are available and in which the size of the cereal forms that may be used may range from those which are quite small to those which are not unreasonably large being limited only by practical marketing considerations.

A still further object is to provide a process whereby a product may be prepared conforming to the specifications detailed immediately above and which is economical, adaptable to large scale production and capable of being carried out by the simple modification of conventional apparatus.

It is now proposed that dried fruit be enclosed within cereal shreds to provide a product wherein the cereal and dried fruit are essentially integral. Enclosing the fruit within such shreds eliminates the possibility of any difficulties with blending and segregation such as are encountered when the finished cereal and dried fruit pieces are simply admixed. Also, this manner of combination affords a greater variety of fruit materials and of cereal forms and sizes together with control of the fruit to cereal ratio so that uniformity in this respect is provided in the individual servings. This proposal is made possible by the discovery that cereal shreds constitute the one cereal form which is capable of withstanding the adverse influence of combination with dried fruits, such as dried apricots, peaches, dates, figs, raisins and the like. The shred form is superior to other cereal forms, such as flakes, puffs and the like, in that it does not become soft and soggy when containing relatively high percentages of moisture. Also, after the fruit has been enclosed within the cereal shreds, it is possible to thereafter further process the cereal at elevated temperatures without any substantial adverse effect on the texture and flavor of the fruit.

The product of the invention is prepared by incorporating the fruit within the shredded cereal product as the latter is formed. Generally, the shredded product is in the form of a biscuit, or similar product, and is formed by depositing layers of moist, cooked shreds on top of each other until a bed of the desired depth or number of shred layers has been laid down. In accordance with the present invention the dried fruit is incorporated in the course of laying down the shreds. Usually, after about half of the shred layers have been laid down, the fruit is deposited on the shreds and the remainder of the shred layers are laid down on top of the fruit.

The shreds are then cut to form the biscuits and these in turn are dried and toasted at elevated temperatures.

It is possible to process the cereal shreds at elevated temperatures as aforementioned without adversely affecting the dried fruit contained therein because of the unique drying characteristics of such shreds. It has been found that on drying the shredded product the outermost shreds are dried substantially completely before the adjacent shreds or layers thereof begin to be dried to any appreciable extent. While in most drying operations the object dried dries from the outside in, such is not generally encountered to the same extreme degree as in the case of cereal shreds. This results in the fruit center being enclosed in an envelope of moist shreds throughout substantially the entire drying period. Also, the preferential drying of the outer shreds occurs very rapidly. Such rapid drying or evaporation of moisture results in a localized cooling effect so that the interior of the shredded product is relatively cool in comparison with the elevated temperatures to which the product is being subjected. Such temperatures are usually about 400°–500° F. for toasting and 175°–350° F. for drying. It has also been shown that in the initial stages of drying the fruit picks up moisture from the cereal which is evaporated therefrom in the later stages with an additional local cooling effect. Accordingly, the combination of the envelope of moist shreds surrounding the fruit center and the localized cooling effect within the interior of the cereal product serves to permit the fruit to be subjected to the elevated temperatures involved in processing the cereal shreds without undergoing substantial drying or alteration of its characteristic texture and fruit flavor to any appreciable degree.

The fact that the outermost shreds of a shredded cereal product are dried completely before there is any substantial amount of drying of the inner shreds is utilized to advantage in connection with toasting, more particularly with the order of drying and toasting. In toasting before drying the inner shreds are not affected and this order of proceeding permits the fruit center to be provided with an envelope of moist shreds which serves to completely insulate the fruit from the adverse effects of the elevated temperatures employed for toasting. Accordingly, it is distinctly preferable to toast before drying the shreds rather than to toast after the shreds have been completely dried and the fruit is no longer enclosed in such a protective envelope, especially since it is during toasting that the most elevated temperatures are employed.

As aforementioned, in order for the fruit to be soft and tender it must contain a sufficiently high percentage of moisture. In other words, a minimum moisture content is required for the fruit to be tender. If the product containing fruit at the minimum moisture content is enclosed in a moisture-proof package a relative humidity in equilibrium with said minimum moisture content must prevail therein. In order for the cereal component of such a product to remain palatable it must be capable of containing a moisture content which is in equilibrium with the same relative humidity without adverse effect. It has been found by testing practically all of the commercially available dried fruits, both alone and in combination with various softening agents, such as sucrose and dextrose syrups, corn syrup, honey and the like, that the minimum moisture content required in the fruit component may range from as low as 11–13% to as high as 21–24%. In all cases, however, the fruits at such moisture contents are in equilibrium with substantially the same relative humidity, namely, 55–65% at room temperature. Of the various cereal forms available, the cereal shred is the only one found to be capable of being in equilibrium with such high relative humidities while retaining a satisfactory degree of crispness and tenderness and remaining otherwise entirely palatable. Other cereal forms, such as flakes and puffs, for example, become soggy and tough to an extent which is totally unacceptable in a cold breakfast cereal.

The dried fruits that may be employed in the process of the invention are those which are customarily known to the trade as such and which are dried, either by sun or artificial drying, to a sufficiently low moisture content, say, 15–30%, so that deterioration by microorganisms is practically eliminated. At such low moisture contents the concentration of the sugars naturally contained in the fruit becomes so high that there is a natural preservative action in the presence of which microorganisms are unable to develop. Among such dried fruits are included apples, apricots, bananas, cherries, dates, figs, raisins, loganberries, nectarines, peaches, pears, prunes and the like. Typical moisture and sugar contents of various dried fruits follow:

| Dried Fruit | Percent Water | Percent Sugars |
|---|---|---|
| Apples | 23 | 46 |
| Apricots | 24 | 46 |
| Bananas | 6 | 9 |
| Figs | 24 | 55 |
| Raisins | 17 | 73 |
| Peaches | 24 | 51 |
| Pears | 24 | 36 |
| Prunes | 18 | 46 |

The shredded type of breakfast cereal with which the present invention is concerned may be manufactured from shreds, strands or other vermicular cereal forms prepared in any suitable manner. Generally, a shredder or an extruder is used for the purpose of preparing such forms and whichever is used depends for the most part upon the cereal and the form in which it is processed. When the cereal employed is in the form of a dough it is usually necessary to use an extruder, whereas if it is cooked in the form of the whole grains or sizable elements thereof it is practicable to use a shredder. A shredder is generally more economical to use than an extruder. Herein and in the appended claims it is intended that the word "shred" shall include strands, strings or such other vermicular forms of cereal materials as may be prepared.

In incorporating the fruit within the shredded cereal product, layers of the same may, if desired, be laid down coextensively with the shred layers in the form of a paste, or pieces thereof may simply be distributed over the surface of the bed of cereal shreds and satisfactory enclosure of the fruit within the shredded product may thereafter be obtained. However, it is preferred that the fruit in the final product be marginally spaced from from the edges thereof and otherwise somewhat centrally disposed. Centering the fruit within the shreds serves to protect it to the maximum extent during the subsequent heat treatment required for drying and toasting the cereal shreds. Such may be conveniently done by depositing the fruit over the bed of shred layers in a pattern so arranged that on forming the product cuts may be made in the intervals between the deposits of fruit thereby securing the marginal spacing around the entire periphery of each biscuit.

Among the fruit units that may be employed it is preferred to use those which are small, such as raisins and the like. However, fruits which are only available in units or segments somewhat inconveniently large may be diced or otherwise cut to a suitable degree to render them more adapted to incorporation into the shredded product. The smaller sized pieces facilitate the incorporation of the fruit and particularly its central location within the shredded product. Also, having the smaller fruit pieces in the product permits it to be more easily cut with a spoon and otherwise handled by the consumer. In the case of raisins, of course, dicing or other cutting operations are not required and, furthermore, are not desirable because when their natural skins are retained intact, the raisins are better able to resist any possible adverse effects of the heat treatment requird for further processing the cereal shreds. For these reasons and because of their popularity the use of raisins is preferred.

For reasons similar to those given above in connection with the incorporation of the fruit within the shredded product and the greater ease in handling that is afforded the consumer, it is preferred to employ many of the fruits in the form of a macerated paste. When employing the fruit in this form it is also preferred to incorporate it within the shreds in a mass or a compact strip since this minimizes the surface that is exposed to the heat treatment and consequently the adverse effects of such treatment.

It is likewise possible to incorporate the fruit in the form of a central layer of fruit shreds. After about half of the layers of cereal shreds have been laid down one or more layers of fruit shreds are then laid down followed by the rest of the cereal shreds being laid down. While most of the fruits are too sticky to permit their being formed into shreds this may be overcome by admixing cooked cereal, preferably dry, in about equal portions with the fruit.

More specific details serving to further illustrate the manner in which the process of the present invention is practiced follow:

Wheat grains are cooked at atmospheric steam pressure in a rotary cooker for 2 hours. The cooked wheat as it comes from the cooker has a moisture content of about 46%. It is formed into shreds of about 0.015 inch in diameter by means of a shredding machine comprised of a series of shredding heads, each of which consists of a pair of rolls revolving toward each other. The cereal elements are forced between the rolls and into the grooves contained therein to drop in a continuous flow of shreds onto a conveyor belt situated beneath the shredding machine. It is preferred to shred the wheat while still warm, say, at about 150° F., and although the wheat may be shredded satisfactorily at a moisture content of from 35–53%, the optimum range is 46–48%. When about 7 shred layers have been deposited on the conveyor belt raisins are deposited over the surface of the shred bed in a prearranged pattern so that on cutting the shreds to form biscuits the raisins will be marginally spaced within the biscuits and otherwise centered therein. Thereafter an equal number of shred layers are deposited on top of the raisins. The shreds are then cut into biscuits using blunt edged knives. Such knives rather than sharp edged knives are employed in order to provide a selvedge and seal off the numerous shred ends. This is usually done along one dimension of the biscuit, namely, that which is transverse to the shreds, although it may also be done along the dimension along which the shreds lie, if desired. The biscuits formed in this manner are usually 4 x 2½ x 1¼ inches. Biscuits of this size are then toasted at 500° F., about 5 minutes being required, and dried in a forced draft oven in 10–20 minutes at 200° F. with an air velocity of 240 ft./min. to a moisture content of about 10% so that the final product is a light brown, crisp shredded wheat biscuit containing raisins which retain their initial soft texture and characteristic flavor. The product is then cooled and packaged in a moisture-proof container.

Of course, as indicated above, it is also possible to use a fruit paste such as one of dates, figs, apricots and the like in the manner described above in connection with raisins. Generally, the paste is laid down in a mass or in a compact strip, the dimensions of which are preferably proportioned somewhat after the dimensions of the biscuit which is to be subsequently formed by cutting.

Instead of the wheat grains employed in the above detailed example one may also prepare shredded products of other cereal grains and grain elements such as those of corn, rice, oats, rye and the like. In addition to such cereals it is also possible to use soya flour to prepare a dough which in turn is extruded as discussed hereinbefore to form a suitable shredded product. Herein and in the appended claims it is intended that the term "cereal" shall include soya products such as soya flour, soya starch and the like. It is also possible to employ various mixtures of the different cereals, especially when the shreds are produced by the preparation of a dough and the extrusion of the same. As would be expected, when cereals such as corn, rice, oats and soys materials are employed, somewhat different drying and toasting conditions will be found to be more advantageous than those specified above in connection with the detailed directions for the use of wheat. Such variations will be desirable especially with regard to the temperatures employed and the duration of the treatment. For various reasons, however, it is preferred to employ wheat grains. As discussed hereinbefore, it is more economical to employ a shredder than an extruder. Of the various cereals, the wheat grain is the most adaptable to shredding and therefore the use of wheat grains provides economies. Moreover, while shreds of cereals other than wheat retain about the same degree of crispness and tenderness as the moisture contents thereof are increased, shreds of many of the other cereals such as those of rice and corn, for example, may aquire a slightly pasty texture. For this reason some care must be taken to insure that the moisture content of the dried fruit is not greatly in excess of the minimum required for palatability and the maintenance of the fruit in a soft and tender condition. Otherwise, with the cereals other than wheat, pastiness can become objectionable to the point of rendering mastication of the cereal difficult and unpleasant. As a practical operating consideration preventing an excessive moisture content in the dried fruit that is employed in the preparation of a paricular product is not especially burdensome. Further, one may substantially avoid or at least minimize this problem by employing appreciable quantities of wheat, say, 50%, with the other cereal or cereals that one may desire to use.

In addition to a biscuit of the size dealt with above, biscuits and other shredded cereal products of greatly different sizes and shapes may also be prepared in accordance with the process of the invention. One such product is the small, so-called "bit size" biscuit which comprises only about 4 layers of shreds and is only about ¾ inch square. With a product of this size it is particularly important that the fruit be accurately deposited in accordance with a pattern such as aforementioned so that on cutting to form he small biscuits the fruit will be properly centered within the envelope of shreds. Also, with such a small product it is possible to toast the cereal shreds in about 3 minutes at, say, 500° F. and to dry the same in about 7–8 minutes at 200° F. with an air velocity of 240 ft./min.

In addition to the shredded cereal product being capable of taking various other forms and sizes as indicated above, the diameter of the cereal shreds may also vary considerably. The shreds may range from those which are exceedingly fine to those which are quite large in diameter, the limitations in this respect being those which are present in connection with the preparation of any other shredded cereal product. In the case of handling very fine shreds the problem is mainly one of the shred breaking or pulling apart whereas the limiting factor in the case of very coarse shreds is in connection with drying the same in a satisfactory manner.

With regard to the amount of fruit that may be contained within the product and yet be enveloped in a sufficient envelope of cereal shreds to protect it against deterioration in the course of the aforementioned heat treatment, it has been found that as much as 50% by weight of the final product may be fruit. From a practical marketing standpoint, however, it is believed preferable that the amount of fruit so contained should be of the order of 25% of the final product.

It will be understood that while the invention has been described above in connection with specific examples that various changes in the details of procedure may be made without departing from the spirit thereof so that accordingly the invention should not be regarded as in any way restricted or defined thereby but rather reference should be had to the appended claims for this purpose.

What is claimed is:

1. A process of preparing a cereal product containing fruit comprising enclosing within a biscuit of moist cooked cereal shreds and centrally disposing therein a quantity of dried fruit, thereafter toasting the outer shreds of said biscuit at a temperature within the range of 400°–550° F., and then drying the inner shreds of said biscuit at a temperature within the range of 175°–350° F. while retaining the characteristic flavor and texture of said fruit.

2. A process of preparing a cereal biscuit containing fruit comprising laying down a bed of about half of the shred layers to be used in forming the biscuit, depositing thereon a quantity of dried fruit, superimposing the remaining shred layers, cutting the shred layers to form the biscuit, and thereafter drying said shreds at an elevated temperature while retaining the characteristic flavor and texture of said fruit.

3. A process of preparing a cereal biscuit containing fruit comprising laying down a bed of about half of the shred layers to be used in forming said biscuit, depositing dried fruit in discontinuous deposits thereon, superimposing the remaining shred layers, cutting the shred layers at the intervals between the deposits of fruit to form the biscuit and secure the central disposition of the fruit within said shreds, and thereafter drying said shreds at elevated temperatures while retaining the characteristic flavor and texture of said fruit.

4. A process of preparing a cereal biscuit containing fruit comprising laying down a bed of about half of the shred layers to be used in forming said biscuit, depositing dried fruit in discontinuous deposits thereon, superimposing the remaining shred layers, cutting the shred layers, at the intervals between the deposits of fruit to form the biscuit and secure the central disposition of the fruit within said shreds and thereafter toasting the outer shreds of said biscuit at a temperature within the range of 400°–550° F., and then drying the inner shreds of said biscuit at a temperature within the range of 175°–350° F. while retaining the characteristic flavor and texture of said fruit.

5. A ready-to-eat cereal biscuit formed of dried crisp cereal shreds and having therein a quantity of dried fruit possessing its characteristic flavor and texture, said fruit forming a body centrally disposed within said biscuit and substantially completely enclosed by said shreds.

References Cited in the file of this patent

UNITED STATES PATENTS

| Number | Name | Date |
|---|---|---|
| 820,899 | Williams | May 15, 1906 |
| 1,382,963 | Ellis | June 28, 1921 |
| 2,020,257 | Dickinson | July 8, 1933 |
| 2,065,550 | Baxter | Dec. 29, 1936 |
| 2,338,588 | Kishlar | Jan. 4, 1944 |

OTHER REFERENCES

Cruess, Fruit Products Journal, vol. 12, June 1933, pp. 302–3.